Figure 1:
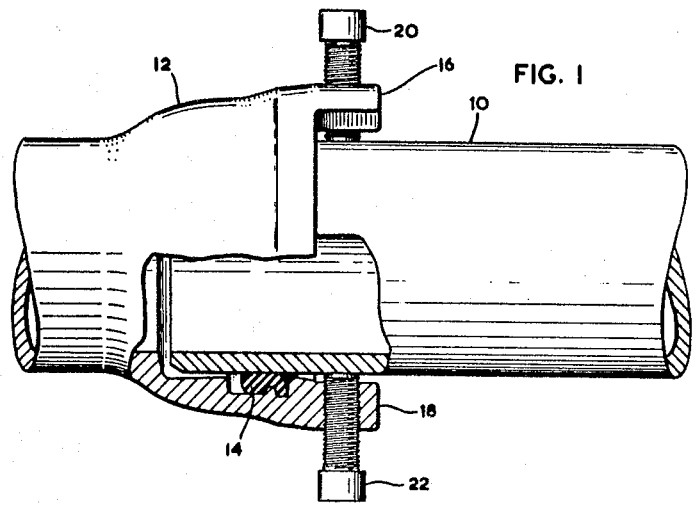

Nov. 8, 1966   L. A. CLEMENTS   3,284,561
ELECTRICAL CONDUCTIVITY MEANS FOR PIPE JOINT FITTINGS
Filed Feb. 12, 1964   2 Sheets-Sheet 1

INVENTOR
LOYDELL A. CLEMENTS
BY Featherstonhaugh & Co.
ATTORNEYS.

Nov. 8, 1966    L. A. CLEMENTS    3,284,561
ELECTRICAL CONDUCTIVITY MEANS FOR PIPE JOINT FITTINGS
Filed Feb. 12, 1964    2 Sheets-Sheet 2

INVENTOR
LOYDELL A. CLEMENTS
BY Fetherstonhaugh & Co.

ATTORNEYS.

United States Patent Office 3,284,561
Patented Nov. 8, 1966

3,284,561
ELECTRICAL CONDUCTIVITY MEANS FOR PIPE JOINT FITTINGS
Loydell Ames Clements, Laval West, Quebec, Canada, assignor to Canada Iron Foundries Limited, Montreal, Quebec, Canada
Filed Feb. 12, 1964, Ser. No. 344,485
Claims priority, application Canada, Apr. 9, 1963, 872,837
5 Claims. (Cl. 174—78)

This invention relates to electric conducting means for metal pipe for use in pipe systems as to establish electrical conductivity between the members thereof.

The establishment of electrical conductivity through a pipe system, particularly underground systems, is necessary in order to permit the heating of the system to avoid freezing during the winter and to avoid the necessity otherwise of digging up the pipe system in the case where it has been rendered ineffective by freezing. A number of proposals have been made in this respect, including a method of my own conception which involves fixing conductor strips to the pipe ends and providing means for connecting the strips after the pipe ends have been joined.

While the above proposal works well to establish electrical conductivity across joints interconnecting standard pipe lengths, it has been found that difficulties arise when using the prior method on joints involving special fittings, such as elbows, T's and the like. Under these circumstances, it is often necessary to cut off a standard length of pipe to obtain a short length of a particular size necessary to close a gap adjacent a fitting. In converting the standard length to the short length, the conductor fixed to the spigot end is eliminated as the spigot end is cut off. This then requires the welding of an additional conductor strip on the short length, thus requiring portable welding equiment, etc.

In accord with this invention, it is proposed to overcome the above noted disadvantage of our prior proposal by employing an alternative arrangement for effecting electrical conductivity across joints involving special fittings. This alternative proposal comprises providing integral lugs on the bell ends of the fittings and pins of conducting metal projecting through the lugs which can then be forced into contact with spigot ends received in the fittings as the joints are formed.

The above and further objects of this invention will be more thoroughly understood from the following description of preferred embodiments thereof as read in conjunction with the accompanying drawings.

Figure 2:
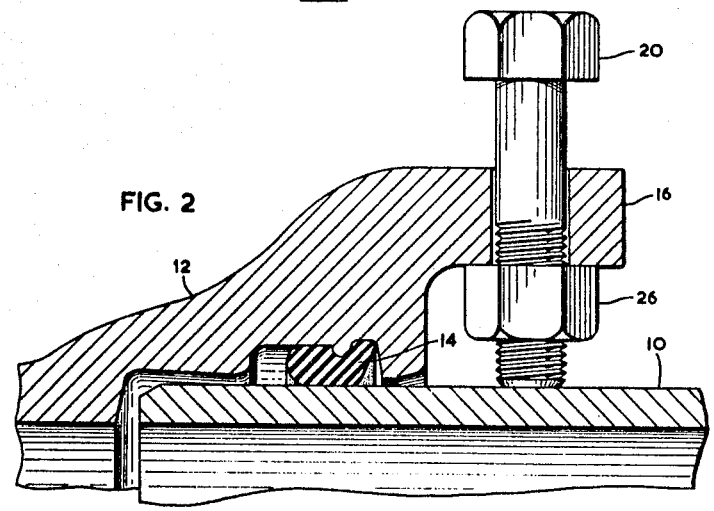
Figure 3:
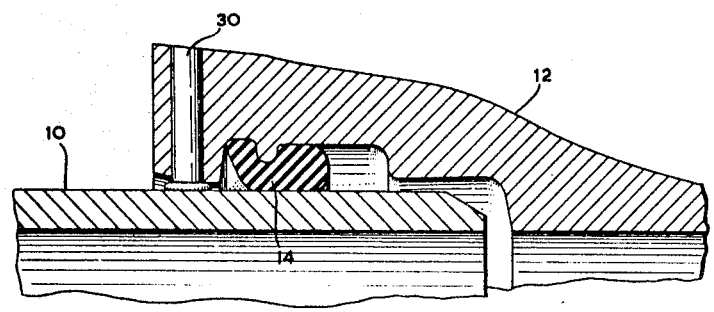
Figure 4:
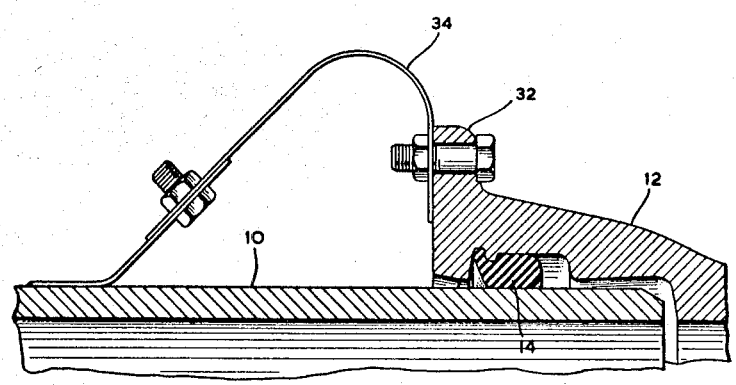

In the drawings:

FIGURE 1 is a side view partly broken away of a bell and spigot joint incorporating electric conducting means in accord with the invention, FIGURE 2 is an enlarged longitudinal cross-sectional view of an alternative embodiment of the conducting means in accord with the invention, FIGURE 3 is a view similar to FIGURE 2 but showing a further embodiment of the invention, and FIGURE 4 is a longitudinal cross-sectional view of a related form of electrical conductivity means.

Referring to FIGURE 1, the illustrated joint connects a spigot end 10 of a length of metal pipe with a bell end 12 of a fitting such as an elbow or a T. In this regard, it is pointed out that, whereas the subject invention has particular utility in effecting conductivity across joints involving fittings such as T's and elbows, its use need not be so restricted. Thus, the invention is quite capable of use with a bell and spigot joint connecting standard pipe lengths.

The illustrated joint is sealed by a sealing gasket 14, which also has the effect of spacing the two pipe ends apart, thereby acting as an insulator preventing current flow between the joined pipe ends. As mentioned above, this difficulty has been overcome in accord with my prior proposal mentioned above, this difficulty has been overcome in accord with my prior invention mentioned above, by welding conductor strips to each of the pipe ends and connecting the strips together when the joints are formed. While this system works most satisfactorily when connecting standard lengths, it has been found that it is not always possible to use a standard length when terminating a run of pipe at a fitting, such as an elbow or T. Thus, it is often necessary to cut off a considerable part of the spigot end of the final standard length and in so doing, the conductor strip is lost, thereby requiring the welding of a new conductor strip onto the shortened spigot end, and this in turn requires the use of portable welding equipment in the field.

The above noted difficulty of our prior proposal is overcome in accord with the present invention by providing other means for effecting electrical conductivity across joints involving fittings. This object of the invention is accomplished by forming integral lugs 16 and 18 on the bell end 12, which lugs extend beyond the normal end of the bell, as to project over exposed portions of the spigot end 10. The lugs 16 and 18 receive bolts 20 and 22, which are advanced radially inward into solid contact with these exposed portions of spigot end 10, thereby effecting the desired electrical conductivity between the two pipe ends.

It is preferable to provide two lugs spaced 180° apart so that tightening of the bolts 20 and 22 will not cause misalignment of the spigot end 10, and a resultant leakage past gasket 14.

In the FIGURE 1 embodiment of the invention, lugs 16 and 18 are cast with threaded apertures by a shell moulding or similar process. As an alternative proposal, the lugs are cast with straight apertures, as shown in FIGURE 2. In this case, the lugs are so formed as to be spaced from the spigot end 10, thereby providing room for nuts 26.

A third proposal is illustrated in FIGURE 3. In this case, lugs 16 and 18 are formed with straight through apertures which receive soft metal conductors 30. The latter are press fitted in the apertures and they are preferably formed of copper. They are initially positioned as to extend a short distance out of the outer ends of the apertures, with the intention that they can be hammered inwardly whereby to upset the inner ends of the conductors which effectively locks them in place. In this regard, it will be appreciated that the soft metal conductors 30 can be shorter than shown in FIGURE 3, with the intent that they will be hammered inwardly by means of a suitable ramming tool.

The arrangement shown in FIGURE 4 is related to those previously described, in that the bell end 12 is provided with an apertured integral lug 32. However, the latter lug is merely provided as an alternative means for fixing the conductor bridging strip 34 to the bell 12. In this embodiment shown in FIGURE 4, the object of providing an integral lug on the bell differs from the object in providing the integral lug in the other embodiments of the invention. In FIGURE 4, the spigot end is shown as provided with a welded conductor strip, whereas the conductor strip has been eliminated from the spigot ends shown in FIGURES 1 to 3. All forms of the invention are related, however, in the provision of an integral lug for the reception of a conductor in the form of a bolt or pin.

While the above specification mentions the formation of the threaded or straight through apertures in the lugs is effected at the time the lugs are originally cast, it is pointed out that these apertures can be formed by drilling through the lugs cast in solid form. In the case of the threaded aperture of the FIGURE 1 embodiment, the threads can be provided on the inside surface of a drill hole by the usual die threading.

What I claim as my invention is:

1. As an article of manufacture, a cast metal pipe member having a bell end for receiving a spigot end of another pipe member, said cast metal pipe member including electric conducting means for effecting electrical connection between said bell end and a spigot end received therein, said electric conducting means comprising an integral lug carried on said bell end and extending outwardly therefrom in a direction generally parallel with the longitudinal axis of said bell end, and a conductor extending through said lug in a direction generally transverse to said bell end axis and adapted to be moved towards said axis and into contact with a spigot end received in said bell end.

2. An article of manufacture as claimed in claim 1 having a second integral lug carried on said bell end at a position generally diametrically opposite said first lug, said second lug also extending outwardly from said bell end in a direction generally parallel with the longitudinal axis of said bell end, and a second conductor extending through said second lug in a direction generally transverse to said bell end axis and also adapted to be moved towards said axis and into contact with a spigot end received in said bell end.

3. An article of manufacture as claimed in claim 2, in which said conductors are bolts which are threadingly interconnected with said lugs.

4. An article of manufacture as claimed in claim 3, in which bolts carry nuts on the inside of said lugs whereby said bolts may be locked in position following contact with a spigot end received in said bell end.

5. An article of manufacture as claimed in claim 2, in which said conductors comprise metal pins press fitted within apertures in said lugs, said pins being formed of soft metal whereby said pins may be locked in positions contacting the outer surface of a spigot end received in said bell end by driving said pins against said received spigot end with sufficient force to upset the inner ends of said pins a sufficient degree to fill the space between the inside surfaces of said lugs and said received spigot end.

References Cited by the Examiner
UNITED STATES PATENTS 622,481 4/1899 Jackson.
3,152,220 10/1964 Gallacher _____ 174—78 X LEWIS H. MYERS, *Primary Examiner.*

DARRELL L. CLAY, *Examiner.*